gals per MCF of gas treated being sufficient and satisfactory for the desired lactam recovery. As previously indicated, however, the particular processing limitations employed in any given application will depend upon the degree of $SO_2$ stripping necessary or desired in any particular application and the particular operating conditions and materials employed in that application. In this regard, it should also be noted that, in some applications, a gas stream being treated in the absorption zone will be subject to more than one such stripping operation as described above to achieve a desired ultimate level of $SO_2$ stripping. If practical, s somewhat larger absorption zone or mass flow rates outside the precise limits herein set forth may be employed to achieve sufficient $SO_2$ stripping for non-polluting discharge to the atmosphere or other disposal or use of the treated gas stream. In other applications, a gas stream may have a relatively low $SO_2$ content, e.g. 150–300 ppm, that is nevertheless to be reduced to an applicable air pollution control specification of, for example, 100 ppm. Likewise, a gas stream may have an $SO_2$ content of about 500 ppm that is to be reduced in the absorption zone to about 250 ppm for non-polluting disposal, an efficiency of stripping in said absorption zone of only about 50 percent being required in this instance. Although the present invention is capable of a highly remarkable and unexpected degree of $SO_2$ stripping, as herein indicated, it is also within the scope of the invention to treat such gas streams under such less stringent requirements of recycle rate, temperature, water content and the like as to achieve the more limited $SO_2$ stripping required for conformance with the applicable standards even though the invention could be utilized to achieve a higher degree of $SO_2$ stripping if more restrictive standards or an overriding environmental concern were to compel such a greater utilization of the invention.

Economic considerations will, of course, ordinarily encourage the practice of the invention with minimum capital costs, and lactam, water and utility requirements. It will be understood, however, that in continuous commercial operations where environmental concerns and regulatory requirements make necessary the continuing adherence to emission control standards without, at the same time, undesired interruption of normal operations, a prudent safety factor will ordinarily be employed to assure successful, continuous operations. Minor mechanical problems causing less than desired pumping or heat exchange capability, and the like, are thus capable of being tolerated without the necessity for costly, unscheduled shut-downs or turnovers interferring with efficient and continuous gas treating operations. In the practice of the invention, therefore, an excess number of equilibrium stages, e.g. bubble trays or length of packed column, will ordinarily be employed over and above that suggested by the theoretical plates requirements, tray efficiencies and the like as discussed above. For appropriate safety factor purposes, the number of actual trays or height of column employed, particularly in the absorption zone, may be increased by up to about 50 percent excess or more, even up to 100 percent, to assure adequate stripping on a continuous basis despite peripheral operating handicaps that may occasionally be encountered. It is a measure of the striking efficiency of the stripping capabilities achieved in the practice of the invention that such ample safety factors can be employed while remaining within the practical, commercially feasible size and operating limitations disclosed and claimed herein. Accordingly, bubble tray absorption zones in continuous commercial operations under the invention will often be at least about 20 ft in length, and in many practical applications, at least about 40 ft in length, because of such practical considerations for successful continuous operations of a commercial plant. It is also within the scope of the invention to practice the present invention by passing the gas stream to be treated through two or more separate absorption zone columns or towers, the overall height of the combination of absorption zone columns being generally within the limits hereinabove set forth with respect to a single such column. In this embodiment, rich lactam solvent having $SO_2$ dissolved therein can be withdrawn from the bottom portion of each column, with fresh regenerated lactam being introduced into the upper portion thereof for descending passage in counter-current contact with the ascending stream of gas to be treated. Alternately, a rich lactam stream having $SO_2$ dissolved therein can be withdrawn from the bottom of one such absorption column and introduced into the upper portion of the next column of a series of two or more such separate columns. In this embodiment, the rich lactam stream removed from the last of such a series of columns would be passed to the distillation zone for regeneration of the lactam solvent by removal of the $SO_2$ dissolved therein. In another embodiment, a single absorption zone column may have regenerated solvent introduced not only at the upper portion as described above, but at one or more intermediate points along the column height. It is also within the scope of the invention to enhance the efficiency of the stripping operation by employed an absorption zone of given, practical size, with two, three or more separate stages each with its own separate lactam solvent introduction point and draw-off point for lactam having $SO_2$ dissolved therein. In this embodiment, the separate lactam streams withdrawn from each stage can be fed to a common distillation or regeneration zone. Likewise, the lactam-rich stream from said distillation zone can be recycled to each of the separate solvent introduction points on the column. It will be understood that each stage of the overall zone or column need not be operated for maximum $SO_2$ stripping efficiency, but that the flexibility of the invention is further enhanced in meeting any desired degree of overall $SO_2$ stripping. For example, an absorption zone having an overall height within the practical, commercially feasible limit recited herein may have three separate draw-off sections. If the first two stages were thus operated to achieve 90 percent $SO_2$ stripping and the third stage, treating a gas stream having a very greatly reduced $SO_2$ content, were operated at only 70 percent removal, the overall treatment would effect a 99.7 percent removal of the $SO_2$ content of the gas stream passing through the absorption zone. This embodiment, therefore, enhances the ready achievement of extremely high levels of $SO_2$ removal in accordance with the present invention as disclosed and claimed herein.

The present invention thus provides a highly effective, commercially attractive technique for stripping $SO_2$ from gas streams. The invention is not only compatible with desired or prospective $SO_2$ specifications for air pollution control, but offers a genuine opportunity for lowering such specifications and enhancing the

SELECTIVE ADSORPTION GAS SEPARATION PROCESS

BACKGROUND OF THE INVENTION

This invention relates to a process for separating gas mixtures by selective adsorption.

Adiabatic pressure swing adsorption systems are well known for separating gas mixtures having selectively adsorbable components. One such system is described in Wagner U.S. Pat. No. 3,430,418 wherein the product (unadsorbed or less strongly adsorbed) gas is delivered at substantially the feed pressure. In the Wagner system at least four separate adsorbent beds are required and piped in parallel flow relationship. Each bed proceeds through four distinct cycle operations: (1) adsorption at constant (feed) pressure, (2) void gas recovery, (3) adsorbate rejection, and (4) repressurization. Adsorption at constant feed pressure is obtained by flowing feed gas through the adsorbent bed and simultaneously delivering product from the bed at substantially feed pressure. Void gas recovery is accomplished by cocurrently depressurizing the bed in the manner of Kiyonaga U.S. Pat. No. 3,176,444 and using the recovered high purity void space gas for repressurizing a second purged bed and also for purging a third depressurized bed. Adsorbate rejection is accomplished by countercurrently depressurizing the bed and then countercurrently purging same at low pressure with high purity void space gas. Repressurization is achieved with gas from which the adsorbate has been either completely or mostly removed. In particular, the necessary gas is obtained partially from a bed being cocurrently depressurized, i.e. void space gas, and partly from another bed on its adsorption stroke, i.e. product gas. The four distinct cycle operations are preferably equal in duration and as previously indicated at least four beds are needed to obtain continuous flow of feed and product. The Wagner system permits recovery of the product component stored within the bed at the end of the adsorption step, a portion of which may be coadsorbed with the preferentially adsorbed component of the feed gas and the balance being stored in the gas phase within the bed, i.e. the void space gas. It is essential for efficient use of the Wagner system to have an adsorbent bed available to receive the cocurrent depressurization gas at the moment in the cycle when such gas is ready to be discharged from another bed. In an improvement of the Wagner system described in Batta U.S. Pat. No. 3,564,816 the bed having completed its constant pressure adsorption step is pressure equalized in two stages for recovery of its void gas; first with an already partially repressurized bed and then with another bed which has just been purged at the lowest pressure of the process.

When product can be accepted for consumption at pressures substantially lower than feed gas pressure, high recovery of the void space gas may be achieved in three beds using the process claimed in application Ser. No. 103,768 filed Jan. 4, 1971 and now U.S. Pat. No. 3,636,679 in the name of Louis B. Batta, incorporated herein by reference to the extent pertinent. In this low pressure product process, compressed feed gas and product gas are simultaneously introduced at opposite ends of a previously purged adsorbent bed for partial repressurization thereof, followed by further repressurization with feed gas only and then product discharge. Simultaneously with the double-ended repressurization, another part of the one component-depleted gas released from the cocurrently depressurizing bed is discharged as low pressure product. These features permit all critical steps to be included which are necessary for efficient feed gas separation and for avoiding intolerable interruption and pressure changes in the flows of feed and product. This particular feed and product, double-ended repressurization process permits control of the quantity of feed admitted to a bed during each cycle. Such control is particularly important in air separation where the amount of feed admitted for repressurization alone can readily exceed the capacity of the bed to separate such amount of feed and to deliver product at desired purity.

However, the improvements in cycle flexibility achieved by the Batta double-ended repressurization process are not sufficient to allow high performance with a two bed system. With only two beds, each bed is "on-stream" (i.e. delivering product) 50 percent of the cycle time. The remainder of the cycle is insufficient time for the bed to be desorbed of the one component and repressurized using the steps of the Batta process.

Another limitation of the Batta double-ended repressurization process is that the product pressure (e.g. 5–15 psig. in the case of oxygen from air separation based on feed air at 40 psig. maximum pressure) is too low for some usages. In such cases an expensive product compressor would be required.

Still another limitation of the Batta double-ended repressurization process is found in certain separations such as the purification of hydrogen and helium from feed streams containing minor amounts of impurities. In such separation, the quantity of feed needed to repressurize the adsorbent beds to maximum pressure may be less than the amount of feed which the bed is capable of separating. If the Batta process were operated in this fashion without fully utilizing the capacity of the adsorbent, then the losses of hydrogen (or other components less strongly adsorbed than the one component) during countercurrent depressurization would be excessive and product recovery would be low.

An object of this invention is to provide an improved process for separation of gas mixtures by selective adsorption which affords the same high purity product and high recovery of the product achievable with prior art systems but with two adsorbent beds.

Another object is to provide such a process with product gas at sufficient pressure for most usages.

Other objects and advantages of this invention will be apparent from the ensuing disclosure and appended claims.

SUMMARY

This invention relates to an adiabatic process for separating gas mixtures by selective adsorption of at least one component at higher pressure and desorption by pressure reduction.

At least two adsorption zones are provided each comprising a bed of adsorbent material, with feed gas mixture introduced to the inlet end and one component-depleted gas flowed from the discharge end. In the general type of prior art adiabatic pressure swing adsorption process of which this invention is an improvement, after termination of feed gas flow gas is released from the discharge end thereby cocurrently depressurizing the adsorption zone to lower pressure, the adsorption zone is purged of the one component at a lowest pressure by flowing one component-depleted gas therethrough from the discharge end to the inlet end, and the purged zone is partially repressurized to an intermediate pressure by introducing one component-depleted gas thereto.

In particular, the improvement of this invention comprises an increasing pressure adsorption step of introducing feed gas to the inlet end of the partially repressurized adsorption zone at pressure higher than said intermediate pressure, selectively adsorbing the one component and simultaneously discharging one component-depleted gas from the zone discharge end, with the feed gas introduction, the one component adsorption and the one component-depleted gas discharge at relative rates such that the pressure of the adsorption zone rises from the intermediate pressure during this step to higher pressure at the end of such step.

Stated otherwise, during the increasing pressure adsorption step the net molal rate of gas introduction to the adsorption zone is greater than the net molal rate of gas adsorption on the bed. In this relationship, "net molal rate of gas introduction" is the rate at which feed gas is introduced minus the above-zero rate at which gas is discharged from the bed, and the "net molal rate of adsorption" is the rate at which components of the feed are removed from the gas phase into the adsorbed phase minus the rate at which components of the feed are displaced or otherwise released from the adsorbed phase. When the net molal rate of gas introduction exceeds the net molal rate of gas adsorption, the adsorption pressure will rise. This may be accomplished by restricting the discharge of one component-depleted gas relative to the inflow of feed.

In a preferred embodiment, the increasing pressure adsorption step continues until the highest pressure level of the process has been attained and the one component adsorption front has moved from the adsorption zone inlet end to a position intermediate the inlet and discharge ends. The location of the one component adsorption front is such that a substantial portion of the zone length downstream of the front is unused, i.e. not yet significantly loaded with the one component. The adsorption zone is thereafter cocurrently depressurized for sufficient duration to move the one component adsorption front to the zone discharge end. During this period, one component-depleted gas is released from the zone and may be used to repressurize or purge another adsorption zone, and/or be discharged as product. In this manner, the adsorbent is fully utilized and maximum recovery of the less strongly adsorbed components is achieved at high purity.

BRIEF DESCRIPTION OF THE DRAWINGS

Referring now to the drawings FIG. 1 shows two adsorbent beds A and B connected in parallel flow relation between feed gas mixture manifold 11, one component-depleted gas manifold 12, purge manifold 13 and waste manifold 14. Automatic valves 15A and 15B direct feed gas flow respectively to first bed A and second bed B. Automatic valves 16A and 16B respectively direct gas from the same beds into manifold 12. Purge manifold 13 joins one component-depleted gas manifold 12 at the discharge end of the two beds, and purge gas is introduced through automatic valves 17A and 17B to beds A and B respectively countercurrent to the direction of feed gas flow. Automatic valves 18A and 18B join waste manifold 14 at the inlet end of the corresponding beds for discharge of countercurrent depressurization gas and purge gas. Valves 19A and 19B at the discharge end upstream of product valves 16A and 16B respectively are the manual trim type for limiting the flow of pressure equalization gas. Feed gas is introduced to manifold 11 by a compressor, and product gas flows through control valve 21 in manifold 12 to the consumer conduit. Valves 23 and 24 reduce the purge gas pressure to essentially one atm., and also hold the flow rate of purge gas constant. This in turn holds the total quantity of purge gas constant since the purge step is preferably a fixed length of time. The flow rate is controlled at a steady value by regulating valve 23 which holds the pressure constant between the two valves 23 and 24. The waste gas in manifold 14 is released through automatic waste discharge valve 25. The last mentioned valve is a flow-limiting device rather than the shut-off type. When "closed" it introduces a flow restriction into the waste manifold 14 which reduces the depressuration rate to a value below that causing attrition of the adsorbent particles. However, for the discharge of purge gas, valve 25 is open to remove the restriction inasmuch as flow is already limited by valve system 23, 24.

FIG. 2 illustrates one timing sequence suitable for use with the FIG. 1 system, employing eight distinct steps each involving commencement and/or termination of flows. Feed and product streams flowing into and out of the two bed system are indicated by vertical lines, i.e. flows in the feed manifold 11 and in the one component-depleted gas manifold 12. The feed manifold 11 connects horizontally with each of the two adsorbent beds and the latter in turn join horizontally with the one component-depleted manifold 12. The repressurization and purge steps which use a portion of the one component-depleted gas are connected horizontally with the steps, e.g. pressure equalization and repressurization which supply the one component-depleted gas. Similarly the repressurization step is horizontally connected with the feed manifold which also supplies gas for this step. All inter-bed flows are identified on the figure.

It will be apparent from FIG. 2 that at any moment of time one of the adsorbent beds is delivering product at constantly varying pressure to the one component-depleted gas manifold 12 as follows: bed B during 10–30 seconds, bed A during 30–90 seconds, and bed B during 90–120 seconds. Accordingly, product flow to the consuming means is continuous.

Figure 1:
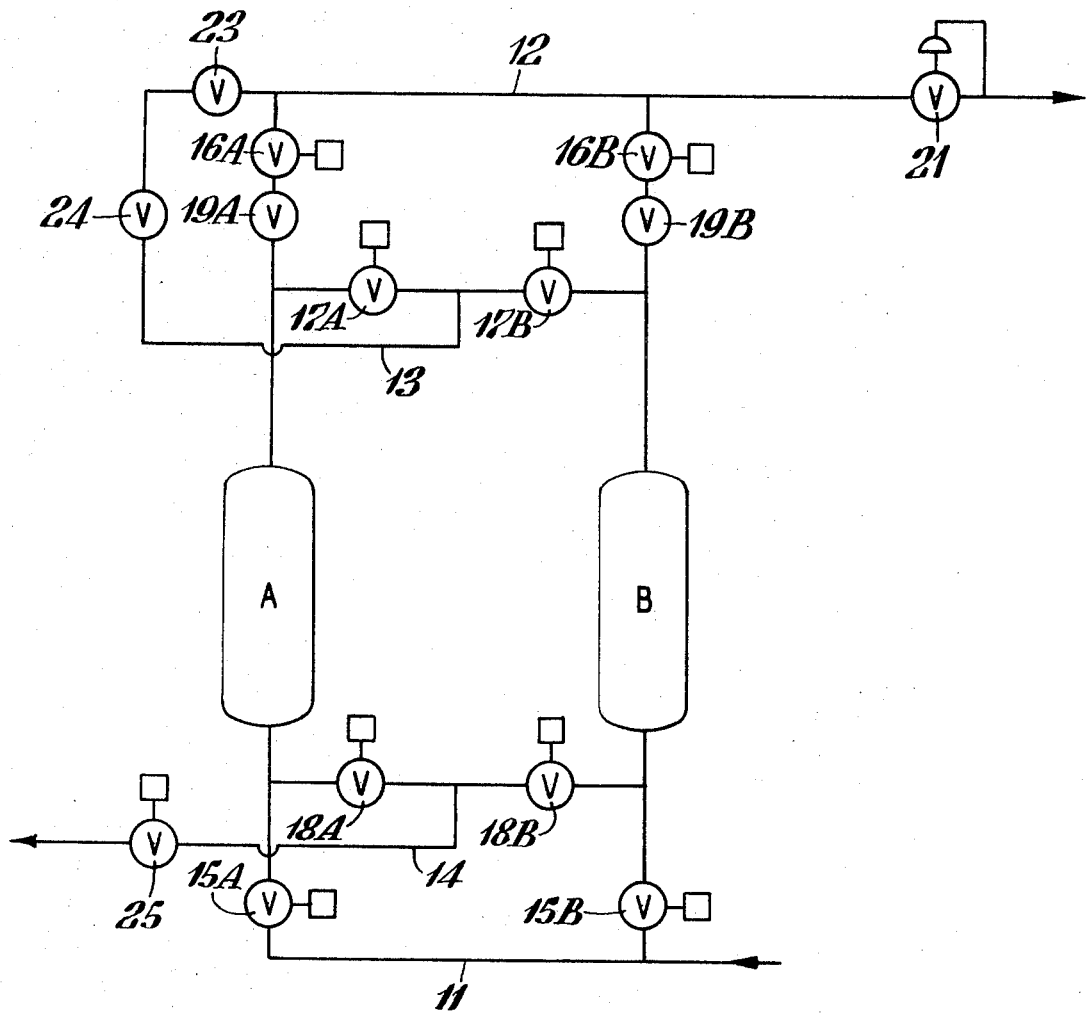
FIG. 1 is a schematic flow sheet of a two adsorbent bed embodiment of the invention.

Each step in the cycle of bed A will now be outlined and related to those components of FIG. 1 which are involved in the cycle changes. Pressures illustrative of such operation for air separation using calcium zeolite A adsorbent are included and are related to the following terms used herein to identify the terminal pressure in a relative sense:

| Term | Illustrative psig. |
|---|---|
| lowest pressure | <1 |
| lower intermediate pressure | 10 |
| equalization pressure | 20 |
| higher intermediate pressure | 32 |
| highest intermediate pressure | 35 |
| highest pressure | 40 |

Time 0–10: Bed A is being repressurized from the lowest process pressure (less than 1 psig.) to the equalization pressure (20 psig.), and bed B is being pressure equalized. Valves 15A and 16A are open and valves 17A and 18A are closed. Feed air is introduced to bed A at its inlet end from manifold 11 through valve 15A and one component-depleted gas from manifold 12 is simultaneously introduced at the bed A discharge end through valve 16A. The latter is derived from bed B undergoing pressure equalization through trim valve 19B, valve 16B, and flows consecutively through valves 16A and trim valve 19A into bed A. Bed B is cocurrently depressurized during this period and the flow continues for about 10 seconds until pressures between beds A and B are substantially equalized at about 20 psig. During this period, the flow of equalization gas is rapid while the flow of feed air from the compressor is limited, so that the major portion of the gas for repressurizing bed A from 0 to 20 psig. is one component-depleted gas, e.g. 85 percent for air separation. During this period, another part of the gas released from bed B is discharged as product in manifold 12.

Time 10–30: Valve 16A is now closed and flow of feed air only continues to bed A for an additional 20 seconds to a higher intermediate pressure of about 32 psig. Simultaneously the bed B cocurrent depressurization continues and all of the nitrogen-depleted gas released therefrom is discharged as product in manifold 12. During this period the bed B pressure diminishes from 20 psig. (equalization) to 10 psig. (lower intermediate). During the bed B pressure equalization and cocurrent depressurization steps, the nitrogen adsorption front has moved progressively toward the bed discharge end, and at this point has reached the discharge end so that breakthrough is imminent. Therefore it can no longer deliver product purity gas to manifold 12 and valve 16B closes. In order for product flow to be uninterrupted, the product gas must be derived from bed A, and in this process the latter delivers product during the remainder of its repressurization.

Time 30–35: Valve 16A again opens and flows of product proceeds from bed A to manifold 12. This is the first part of the bed A increasing pressure adsorption step and the bed pressure rises from 32 psig. (higher intermediate) to 35 psig. (highest intermediate). Simultaneously valve 18B opens, waste discharge valve 25 closes and bed B is counter-currently depressurized through its inlet end to less than 1 psig., the lowest pressure of the process.

Time 35–60: During this remaining part of the bed A increasing pressure adsorption step wherein the bed pressure rises from 35 psig. (highest intermediate) to 40 psig. (highest), valves 17B and 25 are open and part of the nitrogen-depleted gas discharged from bed A flows through valves 23 and 24 and 17B to purge bed B.

At the beginning of the bed A 0–10 second repressurization through both the inlet and discharge ends, a nitrogen adsorption front is established near the inlet end. This front moves progressively toward the discharge end during the remainder of the 10 second period and during the succeeding repressurization steps for the first 60 seconds of the cycle. At the end of this period, a predetermined length of unloaded bed remains between the nitrogen adsorption front and the discharge end.

Time 60–70: Valve 15A closes and valve 16B is opened and bed A now commences pressure equalization with bed B while continuing to deliver product. Bed A is cocurrently depressurized by releasing gas from the discharge end. The gas flows through the unloaded bed length wherein the nitrogen component is adsorbed and the emerging nitrogen-depleted gas is employed in two parts. Oxygen product gas flows through control valve 21 in manifold 12 to the consumer conduit downstream valve 21 at a rate serving to hold the consumer conduit at a suitable low pressure such as 3 psig. The remainder and major part of the nitrogen-depleted gas flows through valves 16B and 19B to the discharge end of bed B for partial repressurization thereof. Bed B has previously been purged of nitrogen adsorbate and is initially at the lowest pressure level of the process. This flow of one component-depleted gas from bed A to bed B continues for about 10 seconds until the two beds are at substantially the same equalization pressure of 20 psig. During this step valve 15B is open and bed B is also being repressurized through its inlet end with feed air from manifold 11.

Time 70–90: Valve 16B closes and additional nitrogen-depleted gas is released from the bed A discharge end for cocurrent depressurization to about 10 psig. (lower intermediate), the entire quantity of this gas from bed A being discharged as product. Simultaneously only the feed air flow is continued to the bed B inlet end for further repressurization thereof from 20 psig. to 32 psig.

Time 90–95: Bed A is now countercurrently depressurized to the lowest process pressure by closing valves 15A, 16A, opening valve 18A and closing valve 25 so the nitrogen desorbate is released through waste manifold 14. Simultaneously valve 16B opens and nitrogen-depleted gas emerges from the bed B discharge end for flow through manifold 12 and valve 21 as product. This is the first part of the bed B increasing pressure adsorption step wherein the bed pressure rises from 32 to 35 psig. during nitrogen adsorption from feed air flowing through the bed.

Time 95–120: Valves 17A and 25 open and part of the nitrogen-depleted gas emerging from bed B is returned from manifold 12 through valves 23 and 24 to the bed A discharge end as purge gas. The latter flows through bed A countercurrently to the feed gas flow direction and desorbs the remaining nitrogen adsorbate. The resulting waste gas is discarded through valve 18A and manifold 14. Simultaneously with the bed A purging, the bed B increasing pressure adsorption step is continued until the bed pressure reaches 40 psig., the highest pressure of the process. At this point valves 17A and 18A are closed and purged bed A is again ready for repressurization in accordance with the foregoing sequence.

Figure 2:
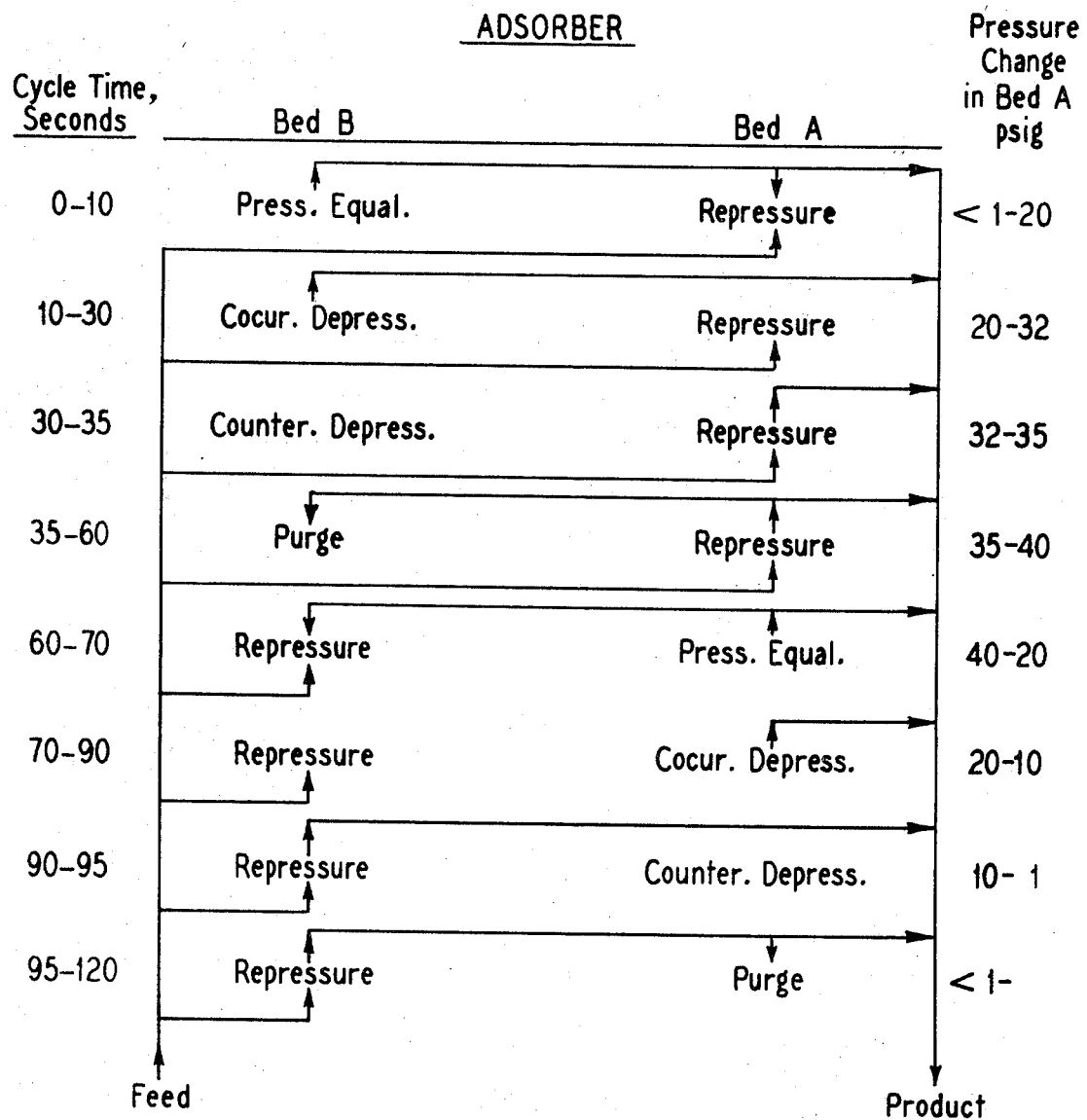
FIG. 2 is a time program for the various steps of a process embodiment suitable for use with the FIG. 1 apparatus.

It might be surmized from first inspection of FIG. 2 that the repressurization of bed A could be accomplished in the 0–30 second period of the cycle merely by increasing the rate of flow of compressed feed. This would permit the following 30–60 second period to function as a constant pressure adsorption stroke delivering product at maximum feed pressure. However, this mode of operation is not feasible. If the rate of feed gas compression is held steady throughout the cycle and is increased sufficiently to complete repressurization in only one-fourth of the cycle, then the higher flow rate of feed sustained through one-half the cycle would exceed the capacity of the bed to separate the larger quantity of feed. On the other hand, if the feed flow is increased only during the first quarter of the cycle and is decreased during the second quarter to maintain the same average rate as appropriate for the process of this invention, then a portion of the feed would necessarily be vented or a very large feed gas surge tank would be required. Either expedient would be costly.

A further inspection of FIG. 2 will also show that if repressurization were completed in only one-fourth of the cycle as proposed above, then the delivery of high pressure product during the adsorption stroke would occur only in alternate quarters of the cycle and low pressure product would be delivered during the remaining periods. It is doubtful that such intermittent flow of high pressure product could be put to beneficial use. In order that the product flow to consumption may be smooth and non-fluctuating, it would be necessary to throttle the high pressure product to the lowest pressure at which product is delivered during other periods of the cycle. Such a compromise would represent a serious inefficiency of power utilization.

By spreading the repressurization (increasing pressure adsorption) step across the full 0–60 second half of the cycle in the manner of this invention, each increment of feed need be compressed only to the minimum pressure required to force the feed into the adsorbent bed. The bed undergoing its final phase of repressurization simultaneously delivers product to the consumer as an increasing pressure adsorption step. The instant process is unique in that an adsorbent bed not only delivers product during cocurrent depressurization but also during half the length of its repressurization stroke.

Summarizing the two bed embodiment of FIGS. 1 and 2; simultaneously, the gas mixture is introduced at superatmospheric pressure to a first bed inlet end, one component-depleted gas is released from a second bed discharge end initially at a highest pressure of the process and one part thereof is flowed to the first bed discharge end until the gas pressures in the first and second beds are substantially equal at an equalization pressure whereupon the second to first bed gas flow is terminated. The gas mixture introduction to the first bed inlet end is continued after such termination thereby further repressurizing the first bed to a higher intermediate pressure, and gas is simultaneously further released from the second bed discharge end for cocurrent depressurization thereof to a lower intermediate pressure. As the first part of an increasing pressure adsorption step for the first bed, the gas mixture introduction to its inlet end is continued at pressure above the higher intermediate pressure for selective adsorption of the one component and simultaneously discharge of one component-depleted gas as product from the first bed discharge end. The gas mixture introduction, the one component adsorption and the one component-depleted gas discharge are at relative rates such that the first bed pressure rises from the higher intermediate pressure to a highest intermediate pressure of the process. Simultaneously with this step still further gas is released from the second bed inlet end for countercurrent depressurization thereof to the lowest pressure of the process, with partial desorption of the one component.

The first bed increasing pressure adsorption step is continued until the bed pressure rises from the highest intermediate pressure to the highest pressure of the process and part of the one component-depleted gas from the first bed discharge end during this continuation is introduced to the second bed discharge end for flow therethrough and purging of the remaining one component. On completion of the first bed increasing bed adsorption step, one component-depleted gas is released from the first bed discharge end initially at the highest pressure, one part thereof is introduced to the second bed discharge end and the remainder of the one component-depleted gas is discharged as product. Simultaneously with this introduction of such product purity gas to the second bed discharge end, the gas mixture is introduced at superatmospheric pressure to the second bed inlet end. This double ended repressurization of the second bed continues until the first and second beds are at the equalization pressure whereupon the flow of one component-depleted gas from the first to the second bed is terminated.

Next, additional gas is released from the first bed discharge end as a cocurrent depressurization step from the equalization pressure to the lower intermediate pressure and the so-released gas is discharged as product. Simultaneously the introduction of gas mixture to the second bed inlet end is continued after the termination of the one component-depleted gas flow to the discharge end, thereby further repressurizing the second bed from the equalization pressure to the higher intermediate pressure.

Still further gas is released from the first bed inlet end for countercurrent depressurization from the lower intermediate pressure to the lowest pressure for partial desorption of the one component. Simultaneously with this countercurrent depressurization, the second bed proceeds through the first part of its increasing pressure adsorption step by continuing the introduction of gas mixture to the inlet end at pressure above the higher intermediate pressure, with the gas mixture introduction, the one component adsorption and the one component-depleted gas discharge at relative rates such that the second bed pressure rises from the higher intermediate pressure to the highest intermediate pressure. During this step all of the one component-depleted gas discharged from the second bed represents product gas. Next, the first bed is purged by introducing one component-depleted gas to the first bed discharge end for flow therethrough at the lowest pressure and further desorption of one component. Simultaneously with this first bed purge step the second bed increasing pressure adsorption step is continued until the second bed pressure rises from the highest intermediate pressure to the highest pressure of the process, and part of the one component-depleted gas from the second bed discharge end is provided as the aforementioned purge gas for the first bed.

Figure 3:
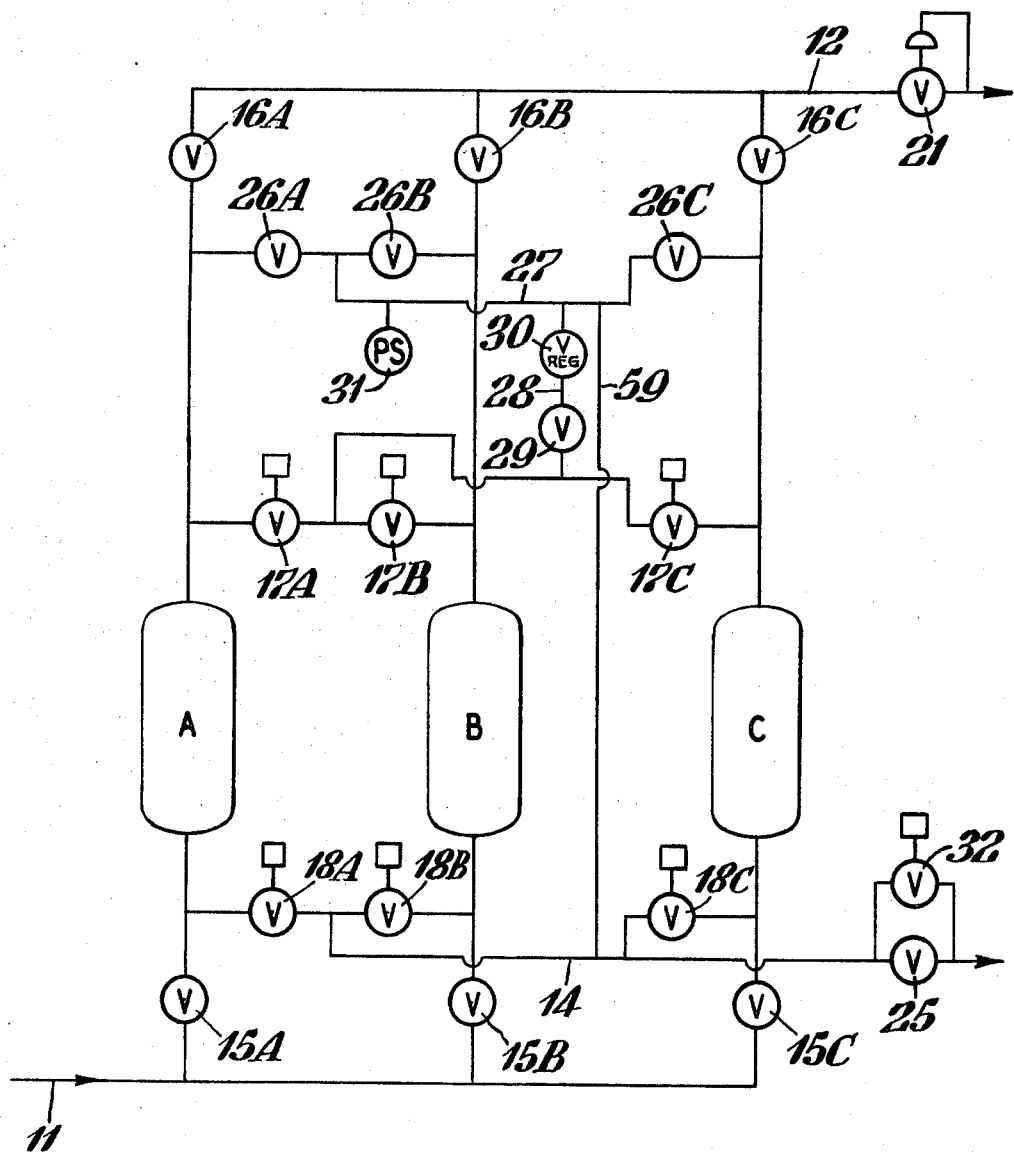
FIG. 3 is a schematic flow sheet of a three adsorbent bed embodiment of the invention.
Figure 4:
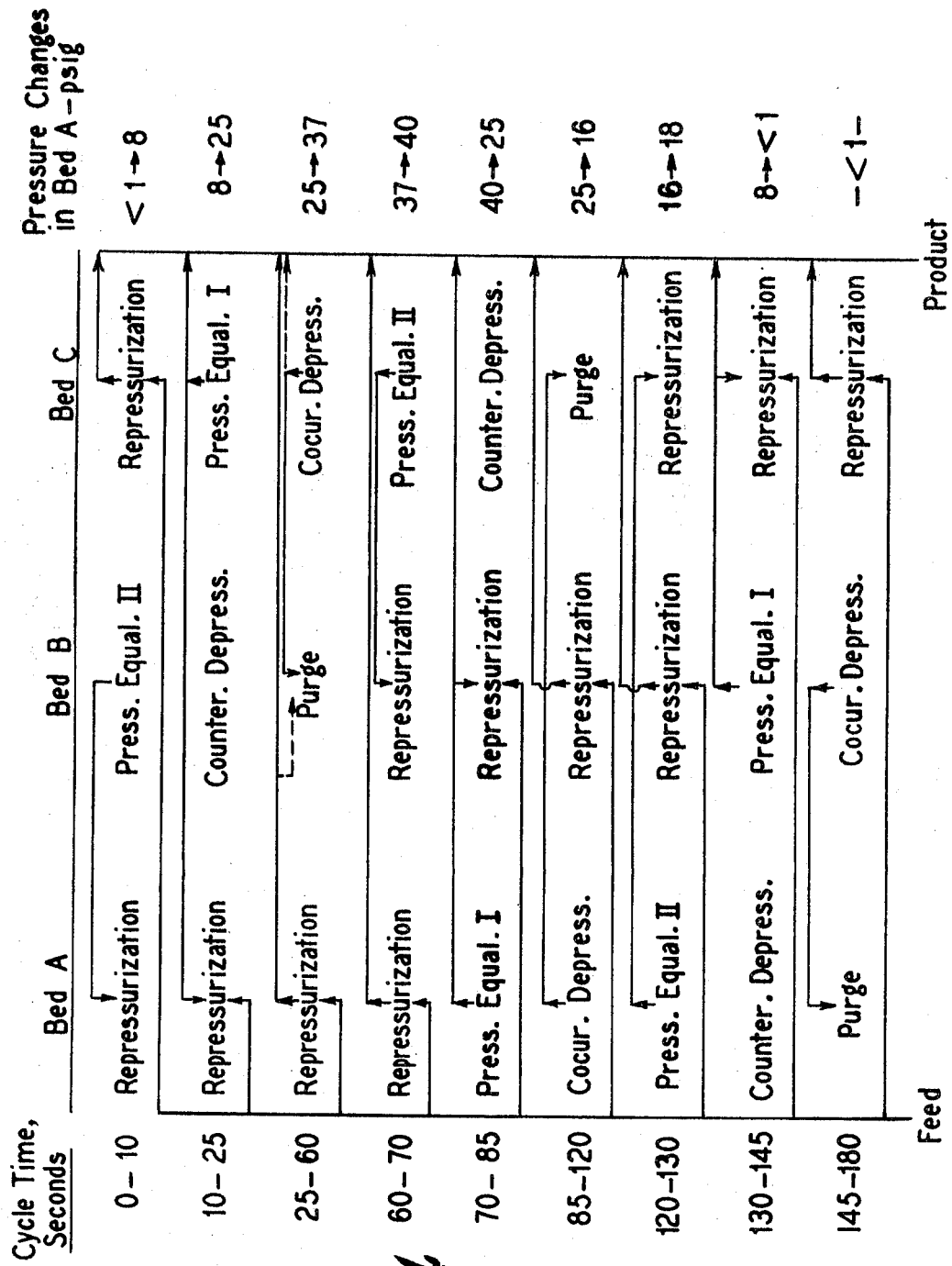
FIG. 4 is a time program for the various steps of two process embodiments suitable for use with the FIG. 3 apparatus.

The invention may also be advantageously employed with three beds as for example illustrated in FIG. 3 wherein beds A, B and C are connected in parallel flow relation with conduits and valves identified by the same numerals used to identify the corresponding components in the two bed embodiment of FIG. 1. FIG. 4 illustrates one timing sequence suitable for use with the FIG. 3 system employing nine distinct steps most of which are analogous to the two bed embodiment but with certain modifications to be described hereinafter in detail. Each step in the cycle of bed A will now be outlined and related to those components of FIG. 3 which are involved in the cycle changes. Pressures illustrative of such operation for air separation using calcium zeolite A adsorbent are included and are related to the following terms used herein to identify the terminal pressure levels in a relative sense:

| Term | Illustrative psig. |
|---|---|
| lowest pressure | <1 |
| lower equalization pressure | 8 |
| lower intermediate pressure | 16 |
| higher equalization pressure | 25 |
| highest intermediate pressure | 37 |
| highest pressure | 40 |

Time 0–10: Bed A is being repressurized from the lowest process pressure to the lower equalization pressure (8 psig.), bed B pressure equalized with bed A, and bed C proceeds through the second part of its increasing pressure adsorption step. Valves 26A and 26B in equalization manifold 27 are open as are valves 15C and 16C. Feed air is introduced to bed C at its inlet end from manifold 11 and one component-depleted gas discharged therefrom through manifold 12 for delivery as product. During this 10 second period the bed C pressure rises from 37 psig. (highest intermediate) to 40 psig. (highest)

Time 10–25: Valves 15C, 26A and 26B are closed, and valves 15A and 16A are open. One part of the nitrogen-depleted gas released from the bed C discharge end flows through manifold 12 and valves 16A into the bed A discharge end, and feed air enters the inlet end of bed A for further repressurization to the 25 psig. higher equalization level. The remaining part of the released nitrogen-depleted gas from bed C is discharged as product. Valve 18B at the bed B inlet end and valve 32 are also opened and valve 25 is closed for simultaneous countercurrent depressurization of bed B from 8 psig. to the lowest pressure of the process, and partial desorption of the nitrogen adsorbate, the latter being released through valve 32 in waste conduit 14. In the FIG. 3 embodiment the bypass around valve 25 is a relatively small conduit so that forcing the flow through the bypass introduces a restriction and limits the flow rate of gas during countercurrent depressurization. Both valves 25 and 32 are "tight-closing" valves for reasons discussed hereinafter.

Time 25–60: Valve 16C closes and the nitrogen-depleted gas flow through valve 16A reverses direction so that this gas, now being discharged from bed A, flows through manifold 12 to consumer valve 21 as product. This is the first part of the bed A increasing pressure adsorption step wherein the bed pressure rises from 25 psig. to the highest intermediate level of 37 psig. Simultaneously bed C is cocurrently depressurized by continued flow of nitrogen-depleted gas from its discharge end. As illustrated by the horizontal full line in FIG. 4, valves 17B, 25, 26C and 29 open and all of this gas may be flowed through valve 26C in manifold 27 and conduit 28 to valve 17B for introduction to the bed B discharge end as purge gas. The latter emerges with the remaining nitrogen adsorbate at the bed B inlet end and flows through valve 18B, valve 25 and waste manifold 14 for venting.

Time 60–70: Flows with respect to bed A are continued for this second part of the increasing pressure adsorption step for this bed. Valves 18B, 17B and 29 close and valve 26B opens so that beds B and C may be equalized at the 8 psig., the lower equalization level.

Time 70–85: Valve 15A closes and valves 15B and 16B open for flow of nitrogen-depleted gas from the bed A discharge end to both the bed B discharge end and also to consumer valve 21 as product. Feed air is also introduced to the bed B inlet end through valve 15B and the two beds are equalized at the higher equalization of 25 psig. Valves 25, 26B and 26C close and valves 18C and 32 open for simultaneous countercurrent depressurization of bed C from 8 psig. to the lowest pressure of the process.

Time 85–120: Valve 16A closes and valves 25, 26A, 29 and 17C open for flow of bed A cocurrent depressurization gas through conduits 27 and 28 (containing back pressure regulator 30) to the bed C discharge end and countercurrent purging thereof at the lowest pressure. This purging continues until terminated by regulator 30 at the lower intermediate pressure of 16 psig. During this period valve 16B remains open for the first part of the bed B increasing pressure adsorption step whereby nitrogen-depleted gas discharged therefrom flows as product to consumer valve 21.

Time 120–130: Valves 29, 17C, 18C and 25 close and valve 26C opens for pressure equalization of beds A and C at the lower equalization level of 8 psig. This two stage pressure equalization with discharge end repressurization is described more completely in U.S. Pat. No. 3,564,816 issued Feb. 23, 1971 to Louis B. Batta, and permits higher recovery of the less strongly adsorbed component from the feed (e.g. oxygen from air). Simultaneously with the beds A and C lower pressure equalization, bed B proceeds through the remaining part of its increasing pressure adsorption step and reaches the highest process pressure (40 psig.).

The above-mentioned U.S. Pat. No. 3,564,816 also describes an alternative arrangement for conducting the second pressure equalization step which obtains still higher recovery of one-component depleted gas. According to the alternative arrangement, the gas withdrawn from the bed undergoing depressurization is introduced to the inlet end of the bed being repressurized. This permits the mass transfer front to be advanced all the way to the discharge end of the bed being depressurized. The loss of purity in the equalization gas which occurs upon breakthrough (of the selectively adsorbed one component) is not detrimental to the cleanliness of the bed being repressurized because the gas does not contact the discharge end of such bed.

FIG. 3 includes provision for flowing the second equalization gas from the discharge end to the inlet end of the two beds. Thus, in the 120–130 second period of the cycle of FIG. 4, valve 18C may be opened rather than valve 26C. Equalization gas may now flow from bed A through 26A, 27, 59 and 18C into bed C inlet end. Since waste manifold 14 is used for conducting this flow, valves 25 and 32 must both be closed while equalization is in progress and until valves 18C and 26A are again closed. When the second equalization step of bed A is complete, the system is prepared for the next 130–145 second step by closing valves 18C, 26A, and 15B and opening valves 18A, 32, 15C and 16C.

Time 130–145: Valves 25, 26A and 26C close and valves 18A and 32 open releasing gas from the bed A inlet end for countercurrent depressurization to the lowest pressure of less than 1 psig. This gas flows through waste manifold 14 and flow restricting valve 32 for venting. Simultaneously valve 15B closes and valves 15C, 16C open for feed air flow to the bed C inlet and flow of nitrogen-depleted gas from bed B to the bed C discharge end for equalization at the higher equalization level of 25 psig.

Time 145–180: Valves 26B, 17A 29 and 25 open, and valve 16B closes allowing nitrogen-depleted gas to flow from the bed B discharge end through back pressure regulator 30 as purge gas for bed A. This flow continues until terminated by regulator 30 when bed B reaches the lower intermediate pressure of 16 l Simultaneously, flow reverses through valve 16C and bed C enters the first part of its increasing pressure adsorption step with nitrogen-depleted gas being discharged therefrom and flowing to consumer valve 21 as product.

Instead of discharging the nitrogen-depleted gas from the first part of the bed A increasing pressure adsorption step as product, this gas may be used alternatively within the process as purge gas for another bed initially at the lowest pressure level and still containing part of the nitrogen adsorbate. However, to insure uninterrupted product flow to the consumer, still another bed must supply product gas and this may be accomplished by directing the nitrogen-depleted gas released during a cocurrent depressurization step to the consumer valve instead of to the previously mentioned bed for purging thereof. In particular these alternative flows are represented in the 25–60 second step of FIG. 4 as dotted lines, the nitrogen-depleted gas from bed A being introduced to the bed B discharge end as purge and the cocurrent depressurization gas from bed C being discharged as product. In the FIG. 3 system these flows may be accomplished at the end of the 10–25 second period by closing valve 16A and opening valves 16C, 26A, 29 (in conduit 28), 17B, 18B and 25. The flows continue until the highest intermediate level of 37 psig. is sensed in bed A by pressure switch 30, the latter actuating an appropriate sequencing means (not illustrated) to affect the subsequent valve changes. At this point, valves 16C, 26A, 29, 17B, 18B and 25 close and valves 16A, 26C and 26B open. The bed A increasing pressure adsorption step continues in the previously described manner (see time 60–70) and all of the nitrogen-depleted gas from bed A is discharged as product until the bed reaches 40 psig., the highest pressure of the process.

A study of the pressure levels attained in the beds will show that operation according to the foregoing alternative mode, illustrated by dotted lines on FIG. 4, results in a lower consumer pressure than the mode illustrated by solid lines. In the solid-line mode, the three steps which produce product from each bed span the pressure range of 25–40 psig. By comparison, in the dotted-line mode, the three product producing steps span a pressure range of 16–40 psig. Thus, the solid-line mode is capable of delivering a higher, steady pressure downstream of valve 21 than is the dotted-line mode.

The FIG. 3 embodiment may also be used to selectively adsorb one or more components from a gas mixture wherein the remaining components are not coadsorbed to an appreciable extent, as for example a dissociated ammonia gas mixture comprising 75 percent hydrogen and 25 percent nitrogen using calcium zeolite A adsorbent. In contrast to the air separation embodiment wherein oxygen is coadsorbed to an appreciable extent along with the preferentially adsorbed one component nitrogen, hydrogen is only slightly adsorbed by calcium zeolite A. The following Table represents an appropriate time program for separating a 75 percent hydrogen-25 percent nitrogen gas mixture using the process steps illustrated in FIG. 4 and employing the FIG. 3 three adsorbent bed calcium zeolite A embodiment.

| Cycle time, minutes | Bed A Step | Pressure Changes In Bed A-Psig |
|---|---|---|
| 0–1 | Repressurization | <1 → 40 |
| 1–2 | Repressurization | 40 → 140 |
| 2–5 | Repressurization | 140 → 210 |
| 5–6 | Repressurization | 210 → 230 |
| 6–7 | Press. Equal. I | 230 → 140 |
| 7–10 | Cocur. Depress. | 140 → 90 |
| 10–11 | Press. Equal. II | 90 → 40 |
| 11–12 | Counter. Depress. | 40 → <1 |
| 12–15 | Purge | —<1 — |

Summarizing the three bed embodiment of FIGS. 3 and 4, one component-depleted gas is introduced at higher pressure to the first bed, the latter having previously been purged of the one component and initially at the lowest pressure. Simultaneously gas is released from the second bed discharge end and flowed to the first bed as the aforementioned one component-depleted gas, the gas releasing and introducing being continued until the gas pressures in the first and second beds are substantially equal at the lower equalization pressure. Also simultaneously with the aforedescribed flows, the third bed proceeds through the second part of its increasing pressure adsorption step whereby gas mixture is introduced to the third bed inlet end which has previously been partially repressurized to the highest intermediate pressure. The one component is selectively adsorbed from the gas mixture in the third bed and one component-depleted gas is discharged from the third bed discharge end with the gas mixture introduction, one component adsorption and one component-depleted gas discharged at relative rates such that the third bed pressure rises from the highest intermediate pressure to the highest pressure of the process.

Now the feed gas mixture is introduced at superatmospheric pressure to the first bed inlet end and one component-depleted gas is simultaneously introduced to the first bed discharge end for further repressurization of the first bed from the lower equalization to the higher equalization pressure, gas is simultaneously released from the third bed discharge end and one part thereof flowed to the first bed discharge end as the one component-depleted gas with the remaining part of the so-released gas discharged as product. The third bed gas releasing and the first bed gas introducing are continued until the first and third bed gas pressures are substantially equal at the aforementioned higher equalization level whereupon the third to first bed gas flow is terminated. Simultaneously with these third and first bed gas flows, gas is released from the second bed inlet end initially at the lower equalization pressure for countercurrent depressurization at the lowest pressure and partial desorption of the one component.

As the first part of the first bed increasing pressure adsorption step the gas mixture introduction to the first bed inlet end is continued at pressure above the higher equalization pressure, the one component is selectively adsorbed and one component-depleted gas discharged from the first bed with the gas introduction and discharge as well as the one component adsorption at relative rates such that the first bed pressure rises from the higher equalization pressure to the highest intermediate pressure. Simultaneously with the foregoing step additional one component-depleted gas is released from the third bed discharge end as a cocurrent depressurization step until the third bed reaches the lower intermediate pressure. A first part of the one component-depleted gas, either derived from the first or the third bed, is introduced to the second bed discharge end for purging of the remaining one component. A second part of the one component-depleted gas, derived from the bed not supplying the second bed purge gas, is discharged as product.

As the second part of the first bed increasing pressure adsorption step, the gas mixture introduction to the first bed inlet end is continued at pressure above the highest intermediate level for selective adsorption of the one component and discharge of one component-depleted gas as product with the gas mixture introduction, one component adsorption and one component-depleted gas discharge at relative rates such that the first bed pressure rises from the highest intermediate level to the highest pressure of the process. Simultaneously, gas is released from the third bed discharge end and introduced to the second bed and the third-to-second bed gas flow is continued until the bed pressures are substantially equal at the lower equalization level.

One component-depleted gas is now released from the first bed discharge end and one part thereof introduced to the second bed discharge end with the remainder discharged as product. Simultaneously, gas mixture is introduced at superatmospheric pressure to the second bed inlet end and the flows are continued until the first and second bed gas pressures are substantially equal at the higher equalization level whereupon the first to second bed gas flow is terminated. During the aforedescribed steps, gas is released from the third bed inlet end initially at the lower equalization pressure for countercurrent depressurization of such bed to the lowest pressure and partial desorption of the one component. In the next step additional one component-depleted gas is released from the first bed discharge end for cocurrent depressurization thereof from the higher equalization to the lower intermediate pressure. At the same time the second bed proceeds through the first part of its increasing pressure adsorption step by continuing the introduction of gas mixture to the inlet end with selective adsorption of the one component and discharge of one component-depleted gas from the second bed discharge end and the gas mixture introduction, one component adsorption and one component-depleted gas discharge at relative rates such that the second bed pressure rises from the higher equalization to the highese intermediate pressure. A first part of the one component-depleted gas, either derived from the first or second bed, is introduced to the third bed discharge end for flow therethrough at the lowest pressure for purging of the remaining one component. A second part of the one component-depleted gas, derived from the bed not supplying the third bed purge gas, is discharged as product.

Now gas is released from the first bed discharge end and flowed to the third bed initially at the lowest pressure with the gas releasing and introducing continued until the first and third bed gas pressures are substantially equal at the lower equalization level. Simultaneously with the foregoing step and as the second part of a second bed increasing pressure adsorption step the gas mixture introduced to the second bed inlet end is continued at pressure above the highest intermediate level and one component-depleted gas discharged as product therefrom until the second bed pressure rises to the highest pressure of the process. Next, gas is released from the first bed inlet end initially at the lower equalization pressure for countercurrent depressurization to the lowest level and partial desorption of the one component therefrom. Simultaneously with this step, one component-depleted gas is released from the second bed discharge end, one part thereof introduced to the third bed discharge end and the remainder discharged as product. Simultaneously with such gas releasing and introducing, gas mixture is also introduced at superatmospheric pressure to the third bed inlet end and the double ended repressurization of the third bed is continued until the second and third bed gas pressures are substantially equal at the higher equalization level whereupon the gas flow from the second to the third bed is terminated.

Now the first bed is purged by one component-depleted gas from either the second bed or the third bed, which gas is introduced to the first bed discharge end. Simultaneously with the first bed purge step, the third bed proceeds through the first part of its increasing pressure adsorption step by continuing the introduction of adsorption step by continuing the introduction of the gas mixture to its inlet end after the one component-depleted gas flow from the second bed to the third bed discharge end has been terminated. During this step the one component is selectively adsorbed in the third bed and one component-depleted gas discharged from the third bed with the gas introduction and discharge as well as one component adsorption at relative rates such that the third bed pressure rises from the higher equalization to the highest intermediate level. At the same time as the first bed purge step and the third bed increasing pressure adsorption step (first part), one component-depleted gas is released from the second discharge end for cocurrent depressurization thereof from the higher equalization level. The one component-depleted gas from the bed not supplying the first bed purge gas, is discharged as product. The aforedescribed steps are thereafter consecutively repeated.

Figure 5:
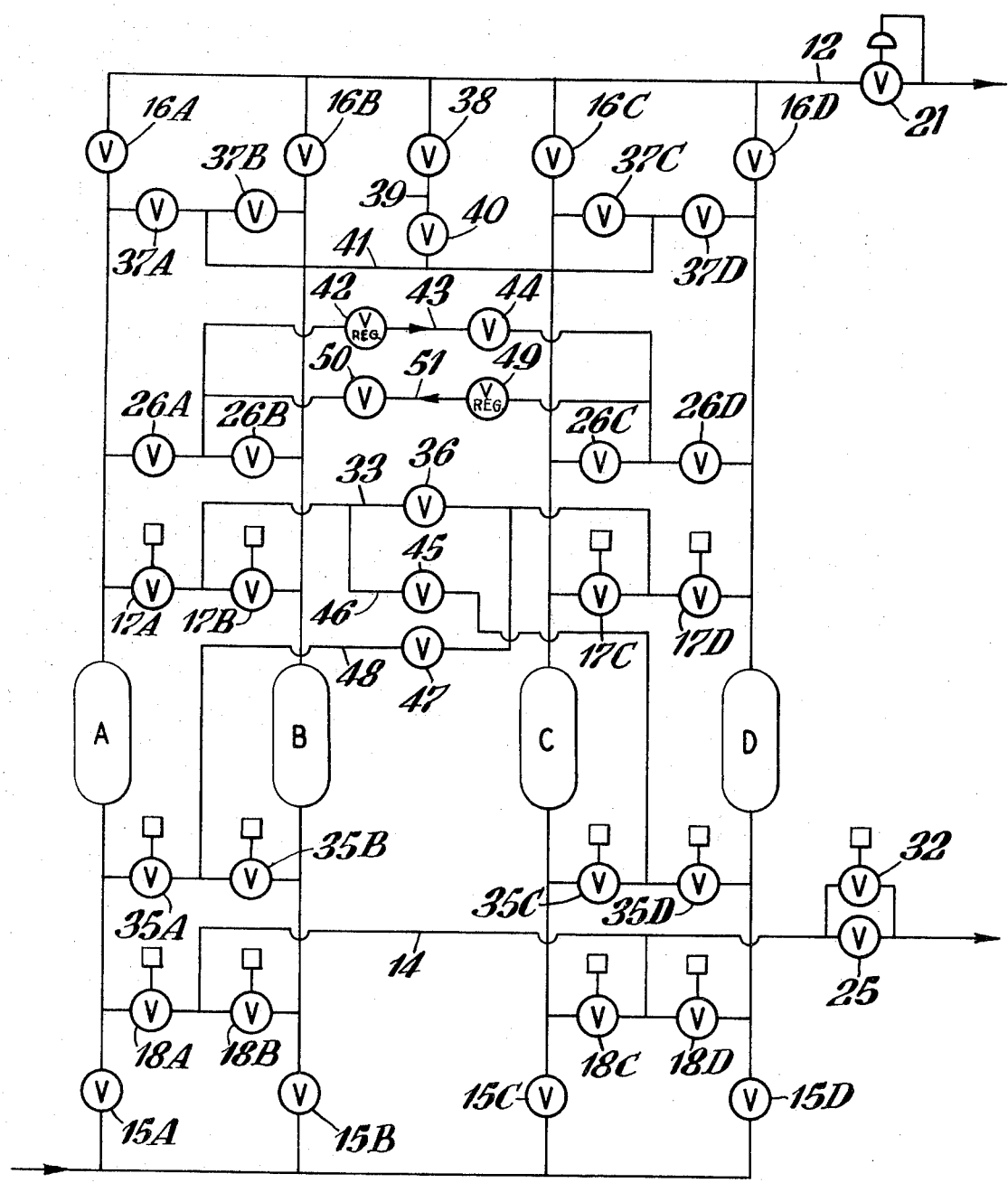
FIG. 5 is a schematic flow sheet of a four adsorbent bed embodiment of the invention.
Figure 6:
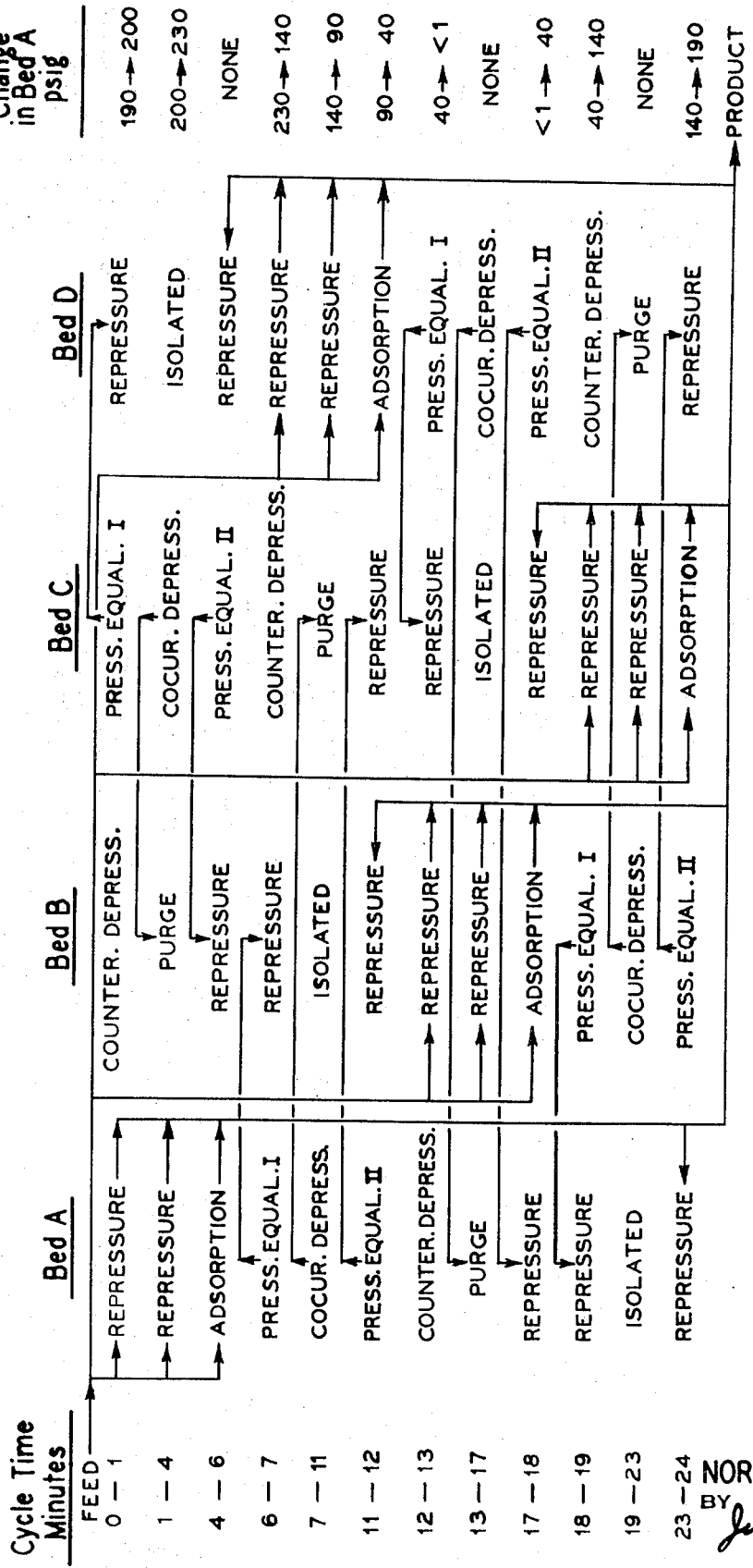
FIG. 6 is a time program for the various steps of a process embodiment suitable for use with the FIG. 5 apparatus.

The invention may also be advantageously employed with four beds as for example illustrated in FIG. 5 wherein beds A, B, C and D are connected in parallel flow relation with conduits and valves identified by the same numerals used to identify the corresponding components in the two and three bed embodiments of FIGS. 1 and 3 respectively. FIG. 6 illustrates one timing sequence for use with the FIG. 5 system employing eleven distinct steps most of which are analogous to the three bed embodiment but with certain modifications to be described hereinafter in detail.

The FIG. 5–6 embodiment illustrates two significantly different process features from the previously described embodiments. The first is a constant pressure adsorption step following the increasing pressure adsorption step. This feature is useful when the adsorbent bed is capable of separating more feed gas mixture than the amount admitted during the increasing pressure adsorption step — a situation apt to occur when the selectively adsorbed one component content of the feed gas is low or when any non-selectively adsorbed component(s) of the feed gas are not strongly coadsorbed with the one component. An example is the aforementioned separation of dissociated ammonia by calcium zeolite A wherein the hydrogen product constitutes a major fraction of the feed and is not strongly coadsorbed with the nitrogen. In such instances the adsorption step may be continued at the constant highest pressure of the process after repressurization of the bed is completed. However, it should be recognized that if the constant highest pressure adsorption step is so extended as to dominate the total period in which the bed is receiving feed gas, the potential savings in power required to compress the feed are greatly diminished.

The other significantly different process feature of the FIG. 5–6 embodiment is that the adsorbent bed is not simultaneously partially repressurized with feed gas and product gas at opposite ends followed by further repressurization with feed gas only, in the manner claimed in the aforementioned application Ser. No. 103,768. Instead, the bed is first partially repressurized with only one component-depleted gas introduced at the discharge end, and thereafter further repressurized (during the increasing pressure adsorption step) only with feed gas introduced at the inlet end.

Each step in the cycle of bed A will now be outlined and related to those components of FIG. 5 which are involved in the cycle changes, beginning at the 17 minute point when the bed has completed its purge step and is at its lowest pressure level. The specific pressure levels are appropriate for dissociated ammonia (75% $H_2$–25% $N_2$) separation using calcium zeolite A adsorbent, and are related to the following terms used herein to identify the terminal pressure levels in a relative sense:

| Term | Illustrative psig. |
|---|---|
| lowest pressure | <1 |
| lower equalization pressure | 40 |
| lower intermediate pressure | 90 |
| higher equalization pressure | 140 |
| higher intermediate pressure | 190 |
| highest intermediate pressure | 200 |
| highest pressure | 230 |

Time 17–18: Bed A has completed its purge step and is initially repressurized with bed D gas at the lower equalization pressure by flowing one component-depleted gas from the latter's discharge end to the bed A discharge end. Valve manipulations associated with bed A are as follows: valves 15A, 16A, 18A, 26A and 35A are closed and valves 17A and 17D are open. One component-depleted gas is delivered from bed D initially at 90 psig. to bed A initially at about 0 psig. through conduit 33 having valve 36 therein.

Time 18–19: Valve 17D closes and valve 17B opens so that beds A and B pressure equalize at the higher equalization pressure.

Time 19–23: Valve 17A closes and bed A is isolated from the system at the higher equalization pressure.

Time 23–24: Valves 37A and 38 (in conduit 39) open and one component-depleted gas from manifold 12 returns to the bed A discharge end through conduit 39, valve 38 and regulator 40, manifold 41 and valve 37A. This flow continues until bed A rises to the higher intermediate pressure, the limit being imposed by regulator valve 40. At this point, the pressure in manifold 11 is the highest level of the process (230 psig.) and more than adequate for repressurizing bed A to the higher intermediate level.

Time 0–4: For this first part of the bed A increasing pressure adsorption step, valves 38 and 37A are closed and valves 15A and 16A are opened. The pressure of bed A increases as feed gas is admitted and one component-depleted gas is simultaneously delivered through control valve 21 to the consumer conduit.

Time 4–5: By way of comparison with the FIG. 2 two bed embodiment, a larger portion of the total repressurization (to the highest process pressure) is achieved with one component-depleted gas, and a smaller portion is achieved with feed gas. Accordingly, at the point in the cycle where the highest pressure level is attained, bed A contains a smaller quantity of one component adsorbate and is capable of separating still more feed gas mixture before commencing the higher pressure equalization step. Accordingly, the adsorption step is continued for an additional 2 minutes at the steady, highest pressure level of the process. During this period the bed not only delivers one component-depleted gas to control valve 21 as product, but also provides another part of the same gas to the discharge end of bed D for further repressurization thereof from the higher equalization level to the higher intermediate pressure (140 → 190 psig.). The latter quantity of gas is returned to bed D through valve 38 and regulator 40 in conduit 39, manifold 41 and valve 37D.

Time 6–7: Bed A now pressure equalizes with bed B at the higher level of 140 psig. This is accomplished by closing valves 15A and 16A while opening valves 17A and 17B.

Time 7–11: Bed A cocurrently depressurizes to the lower intermediate pressure of 90 psig. with the one component-depleted gas emerging from its discharge end and flowing into the bed C discharge end for purging thereof. This is accomplished by closing valves 17A and 17B and opening valves 26A and 26C, so that gas flows through back pressure valve 42 and trim valve 43 in purge conduit 44 to bed C. This flow continues for four minutes until the bed A pressure declines to 90 psig. — a pressure limit imposed by valve 42.

Time 11–12: Bed A pressure equalizes with bed C at the lower equalization pressure of 40 psig. by closing valves 26A and 26C, and opening valves 17A and 17C so that one component-depleted gas enters the bed C discharge end. Alternatively the equalization gas may be introduced to the feed end rather than the discharge end of the receiving bed, i.e. through one of valves 35A–35D rather than through one of valves 26A–26D. For the bed A to bed C pressure equalization this may be accomplished by closing valve 36 and opening valve 45 in feed end repressurization conduit 46. For the corresponding pressure equalization of either bed A or B with bed C or D, valve 47 in conduit 48 is opened. As previously discussed, feed end admission for the lower equalization step allows the adsorption front to partially break through the bed undergoing cocurrent depressurization without simultaneously contaminating the discharge end of the receiving bed. In this manner the terminal pressure reached during lower pressure equalization can be reduced and the recovery of non-selectively adsorbed component further increased.

Time 12–13: For countercurrent depressurization of bed A, valves 17A and 25 close and valve 18A opens. Waste gas flows through valve 18A and conduit 14 and the flow rate is restricted by valve 32.

Time 13–17: Valves 26A, 26D and 25 now open and bed A is purged with one component-depleted gas from bed D. This gas, initially at the higher equalization pressure of 140 psig., flows through back pressure valve 49 and trim valve 50 in purge conduit 51 to the bed A discharge end. This flow continues until the bed D pressure drops to the lower intermediate pressure of 90 psig. as imposed by back pressure valve 49. Waste gas emerging from the bed A inlet end with one component desorbate flows through conduit 14 and valve 25 for discharge from the system. Valves 26A, 26D and 18A are closed and bed A is ready to repeat the previously described cycle.

Although certain embodiments have been described in detail, it will be appreciated that other embodiments are contemplated along with modifications of the disclosed features, as being within the scope of the claims.

What is claimed is:

1. In an adiabatic process for separating gas mixtures by selectively adsorbing at least one component in each of at least two adsorption zones at higher pressure by sequentially introducing said feed gas mixture to the inlet end of one of said adsorption zones comprising a bed of adsorbent material for selective adsorption of said one component and flowing one component-depleted gas from the discharge end of said adsorption zone, terminating the feed gas flow to the adsorption zone and releasing gas from the discharge end thereof thereby cocurrently depressurizing the adsorption zone to lower pressure, purging said adsorption zone of said one component at a lowest pressure by flowing one component-depleted gas therethrough from the discharge end to the inlet end, and partially repressurizing the purged zone to intermediate pressure by introducing at least one component-depleted gas thereto; the improvement comprising an increasing pressure adsorption step of introducing feed gas to the inlet end of the partially repressurized adsorption zone at pressure higher than said intermediate pressure, selectively adsorbing said one component and simultaneously discharging one component-depleted gas from the zone discharge end with the feed gas introduction, one component adsorption and one component-depleted gas discharge at relative rates such that the pressure of said adsorption zone rises from said intermediate pressure during said step to higher pressure at the end of such step.

2. A process according to claim 1 wherein at least one part of said one component-depleted gas discharged from said adsorption zone during said increasing pressure adsorption step is introduced to another adsorption zone loaded with said one component for said purging at said lowest pressure.

3. A process according to claim 1 wherein said feed gas mixture is continuously supplied at said highest pressure, and said increasing pressure adsorption step is continued until the pressure of said adsorption zone rises to said highest pressure.

4. A process according to claim 1 wherein said feed gas mixture is continuously supplied at said highest pressure, and said increasing pressure adsorption step is continued until the pressure of said adsorption zone rises to said highest pressure and thereafter the feed gas introduction, one component adsorption and one component-depleted gas discharge are continued at relative rates such that said one component-depleted gas is discharged from the adsorption zone at substantially said highest pressure so as to comprise a constant pressure adsorption step.

5. A process according to claim 1 wherein at least part of said one component-depleted gas discharged from said adsorption zone during said increasing pressure adsorption step is introduced to another previously purged adsorption zone for said partially repressurizing thereof.

6. A process according to claim 1 wherein said gas mixture is air, said selective adsorbent is calcium zeolite A, and said one component is nitrogen.

7. In an adiabatic process for separating gas mixtures by selectively adsorbing at least one component in an adsorption zone at higher pressure and desorbing said one component by pressure reduction to and purging at a lowest pressure, the improvement comprising the steps of:

a. providing two beds of adsorbent material each with inlet and discharge ends;

b. simultaneously introducing said gas mixture at superatmospheric pressure to the inlet end and introducing one component-depleted gas to the discharge end of a first adsorbent bed having previously been purged of said one component and initially at said lowest pressure;

c. simultaneously with step (b), releasing gas from the discharge end of a second adsorbent bed initially at said highest pressure of said process, flowing one part of the so-released gas to the first bed discharge end as said one component-depleted gas and discharging another part of said so-released gas as product;

d. continuing the gas flows of steps (b) and (c) until the gas pressure in said first and second beds are substantially equal at an equalization pressure, and then terminating the one component-depleted gas flow from the second bed to the first bed;

e. continuing the introduction of said gas mixture to the first bed inlet end after the one component-depleted gas flow termination of step (d) thereby further repressurizing said first bed to a higher intermediate pressure, and simultaneously further releasing gas from the second bed discharge end for cocurrent depressurization thereof to a lower intermediate pressure and discharging the so-released gas as product;

f. as the first part of an increasing pressure adsorption step, continuing the introduction of said gas mixture to the first bed inlet end at pressure above said higher intermediate pressure, selectively adsorbing said one component and simultaneously discharging one component-depleted gas as product from the first bed discharge end with the gas mixture introduction, one component adsorption and one component-depleted gas discharge at relative rates such that the first bed pressure rises from said higher intermediate pressure to a highest intermediate pressure of said process;

g. simultaneously with step (f), releasing still further gas from the second bed inlet end for countercurrent depressurization thereof to said lowest pressure and partial desorption of said one component;

h. continuing said increasing pressure adsorption step (f) until the first bed pressure rises from said highest intermediate pressure to said highest pressure of said process and introducing part of said one component-depleted gas from the first bed discharge end to the second bed discharge end for flow therethrough and purging of remaining one component;

i. terminating the gas mixture introduction to the first bed inlet end and releasing one component-depleted gas from the discharge end of said first bed initially at said highest pressure, introducing one part thereof to the second bed discharge end and discharging the remainder of said one component-depleted gas as product;

j. simultaneously with step (i) introducing said gas mixture at superatmospheric pressure to the second bed inlet end;

k. continuing the gas flows of steps (i) and (j) until the gas pressures in said first and second beds are substantially equal at said equalization pressure, and then terminating the one component-depleted gas flow from the first bed to the second bed;

l. releasing additional gas from the first bed discharge end as a cocurrent depressurization step from said equalization pressure to said lower intermediate pressure and discharging the so-released gas as product;

m. simultaneously with step (l) continuing the introduction of said gas mixture to the second bed inlet end after the one component-depleted gas flow termination of step (k) thereby further repressurizing said second bed from said equalization pressure to said higher intermediate pressure;

n. releasing still further gas from the first bed inlet end for countercurrent depressurization thereof from said lower intermediate pressure to said lowest pressure and partial desorption of said one component;

o. simultaneously with step (n) as the first part of a second bed increasing pressure adsorption step, continuing the introduction of said gas mixture to the second bed inlet end at pressure above said said higher intermediate pressure, selectively adsorbing said one component and simultaneously discharging one component-depleted gas as product from the second bed discharge end with the gas mixture introduction, one component adsorption and one component-depleted gas discharge at relative rates such that the second bed pressure rises from said higher intermediate pressure to said highest intermediate pressure;

p. as a first bed purge step, introducing one component-depleted gas to the first bed discharge end for flow therethrough at said lowest pressure and purging of remaining one component;

q. simultaneously with step (p) continuing said increasing pressure adsorption step (o) until the second bed pressure rises from said highest intermediate pressure to said highest pressure and providing part of said one component-depleted gas from the second bed discharge end as the first bed purge gas for step (p); and r. thereafter consecutively repeating steps (b) through (q).

8. In an adiabatic process for separating gas mixtures by selectively adsorbing at least one component in an adsorption zone at higher pressure and desorbing the selected component by pressure reduction to and purging at a lowest pressure, the improvement comprising the steps of:

a. providing three beds of selective adsorbent material each with inlet and discharge ends;

b. introducing one component-depleted gas at higher pressure to a first adsorbent bed having previously been purged of said one component and initially at said lowest pressure, and simultaneously releasing gas from the discharge end of a second adsorbent bed and flowing the so-released gas to the first bed discharge end as said one component-depleted gas, and continuing such releasing and introducing until the gas pressures in said first and second beds are substantially equal at lower equalization pressure;

c. simultaneously with step (b) as the second part of a third bed increasing pressure adsorption step, introducing said gas mixture to the inlet end of a third adsorbent bed having previously been partially repressurized to a highest intermediate pressure, selectively adsorbing said one component from said gas mixture and simultaneously discharging one component-depleted gas as product from the third bed discharge end with the gas mixture introduction, one component adsorption and one component-depleted gas discharge at relative rates such that the third bed pressure rises from said highest intermediate pressure to a highest pressure of said process;

d. introducing said gas mixture at superatmospheric pressure to the first bed inlet and simultaneously introducing one component-depleted gas to the first bed discharge end for further repressurization of said first bed, simultaneously releasing gas from the third bed discharge end and flowing one part of the so-released gas to the first bed discharge end as said one component-depleted gas and discharging the remaining part of said so-released gas as product, and continuing such releasing and introducing until the first and third bed gas pressures are substantially equal at higher equalization pressure, and then terminating the gas flow from said third bed to said first bed;

e. simultaneously with step (d), releasing gas from the second bed inlet end initially at said lower equalization pressure for countercurrent depressurization thereof to said lowest pressure and partial desorption of said one component;

f. as the first part of a first bed increasing pressure adsorption step, continuing the introduction of said gas mixture to the first bed inlet end after the one component-depleted gas flow termination of step (d) at pressure above said higher equalization pressure, selectively adsorbing said one component and simultaneously discharging one component-depleted gas from the first bed with the gas mixture introduction, one component adsorption and one component-depleted gas discharge at relative rates such that the first bed pressure rises from said higher equalization pressure to said highest intermediate pressure;

g. simultaneously with step (f) releasing additional one component-depleted gas from the third bed discharge end as a cocurrent depressurization step from said higher equalization pressure to a lower intermediate pressure;

h. simultaneously with steps (f) and (g) introducing a first part of said one component-depleted gas to the second bed discharge end for flow therethrough and purging of remaining one component, and discharging a second part of said one component-depleted gas as product;

i. as the second part of a first bed increasing pressure adsorption step, still continuing the gas mixture introduction to the first bed inlet end at pressure above said highest intermediate pressure, selectively adsorbing said one component and simultaneously discharging one component-depleted gas as product from the first bed with the gas mixture introduction, one component adsorption and one component-depleted gas discharge at relative rates such that the first bed pressure rises from said highest intermediate pressure to said highest pressure of said process;

j. simultaneously with step (i), releasing gas from the third bed discharge end, introducing the so-released gas to the second bed, and continuing such releasing and introducing until the gas pressures in said second and third beds are substantially equal at said lower equalization pressure;

k. releasing one component-depleted gas from the first bed discharge end and introducing one part of the so-released gas to the second bed discharge end and discharging the remainder of said so-released gas as product, simultaneously with such releasing and introducing also introducing gas mixture at superatmospheric pressure to the second bed inlet end and continuing such releasing and introducing until the first and second bed gas pressures are substantially equal at said higher equalization pressure, and then terminating the gas flow from said first bed to said second bed;

l. simultaneously with step (k), releasing gas from the third bed inlet end initially at said lower equalization pressure for countercurrent depressurization thereof to said lowest pressure and partial desorption of said one component;

m. releasing additional one component-depleted gas from the first bed discharge end as a cocurrent depressurization step from said higher equalization pressure to said lower intermediate pressure;

n. simultaneously the step (m) as the first part of a second bed increasing pressure adsorption step, continuing the introduction of said gas mixture to the second bed inlet end after the one component-depleted gas flow termination of step (l) at pressure above said higher equalization pressure, selectively adsorbing said one component and simultaneously discharging one component-depleted gas from the second bed with the gas mixture introduction, one component adsorption and one component-depleted gas discharge at relative rates such that the second bed pressure rises from said higher equalization pressure to said highest intermediate pressure;

o. simultaneously with steps (m) and (n) introducing a first part of said one component-depleted gas to the third bed discharge end for flow therethrough and purging of remaining one component, and discharging a second part of said one component-depleted gas as product;

p. releasing gas from the first bed discharge end and flowing the so-released gas to the third bed initially at said lowest pressure and continuing such releasing and introducing until the gas pressures in said first and third beds are substantially equal at said lower equalization pressure;

q. simultaneously with step (p) as the second part of a second bed increasing pressure adsorption step, still continuing the gas mixture introduction to the second bed inlet end at pressure above said highest intermediate pressure, and simultaneously discharging one component-depleted gas as product from the second bed with the gas mixture introduction, one component adsorption and one component-depleted gas discharge at relative rates such that the second bed pressure rises from said highest intermediate pressure to said highest pressure of said process;

r. releasing gas from the first bed inlet end initially at said lower equalization pressure for countercurrent depressurization thereof to said lowest pressure and partial desorption of said one component;

s. simultaneously with step (r) releasing one component-depleted gas from the second bed discharge end and introducing one part of the so-released gas to the third bed discharge end and discharging the remainder of said so-released gas as product, simultaneously with such releasing and introducing also introducing gas mixture as superatmospheric pressure to the third bed inlet end and continuing such releasing and introducing until the second and third bed gas pressures are substantially equal at said higher equalization pressure, and then terminating the gas flow from said second bed to said third bed;

t. as a first bed purge step, introducing one component-depleted gas to the first bed discharge end for flow therethrough at said lowest pressure and purging of remaining one component;

u. simultaneously with step (t) as the first part of a third bed increasing pressure adsorption step, continuing the introduction of said gas mixture to the third bed inlet end after the one component-depleted gas flow termination of step (s) at pressure above said higher equalization pressure, selectively adsorbing said one component and simultaneously discharging one component-depleted gas from the third bed with the gas mixture introduction, one component adsorption and one component-depleted gas discharge at relative rates such that the third bed pressure rises from said higher equalization pressure to said highest intermediate pressure;

v. simultaneously with steps (t) and (u) releasing additional gas from the second bed discharge end for cocurrent depressurization thereof from said higher equalization pressure; (w) providing a first part of said one component-depleted gas from steps (u) and (v) as the purge gas for step (t) and discharging a second part thereof as product; and x. thereafter consecutively repeating steps (b) through (w).

9. A process according to claim 8 wherein said gas mixture comprises 75 percent hydrogen and 25 percent nitrogen, said selective adsorbent is calcium zeolite A, and said one component is nitrogen.

* * * * *

UNITED STATES PATENT OFFICE
CERTIFICATE OF CORRECTION

Patent No. 3,738,087          Dated June 12, 1973

Inventor(s) Norman R. McCombs

It is certified that error appears in the above-identified patent and that said Letters Patent are hereby corrected as shown below:

In the Drawings:

Figure 4, seventh step, after "16", delete "18" and insert --8--.

Column 4, line 63, delete "10-30" and insert --0-30--.

Column 5, line 60, delete "closes" and insert --opens--.

Column 5, line 67, delete "valves" and insert --valve--.

Column 5, line 67, delete "and 25 are open" and insert --opens--.

Column 6, line 45, delete "closing" and insert --opening--.

Column 6, line 54, delete "Valves" and insert --Valve--.

Column 6, line 54, delete "and 25 open" and insert --opens--.

Column 7, line 35, delete "(increasing pres-"; line 36, delete "sure adsorption)".

UNITED STATES PATENT OFFICE
CERTIFICATE OF CORRECTION

Patent No. 3,738,087   Dated June 12, 1973

Inventor(s) Norman R. McCombs

It is certified that error appears in the above-identified patent and that said Letters Patent are hereby corrected as shown below:

Column 8, line 18, delete "bed" and insert --pressure--.

Column 11, line 47, delete "30" and insert --31--.

Column 14, line 40, delete "adsorption step by continuing the introduc-"; line 41, delete "tion of".

Column 16, line 19, delete "4-5" and insert --4-6--.

In the Claims:

Column 22, line 35 (by actual count), delete "as" and insert --at--.

Signed and Sealed this

Seventh Day of November 1978

[SEAL]

Attest:

RUTH C. MASON
Attesting Officer

DONALD W. BANNER
Commissioner of Patents and Trademarks